M. KIMBLE.
HOISTING DEVICE.
APPLICATION FILED APR. 22, 1908.
917,311.
Patented Apr. 6, 1909.
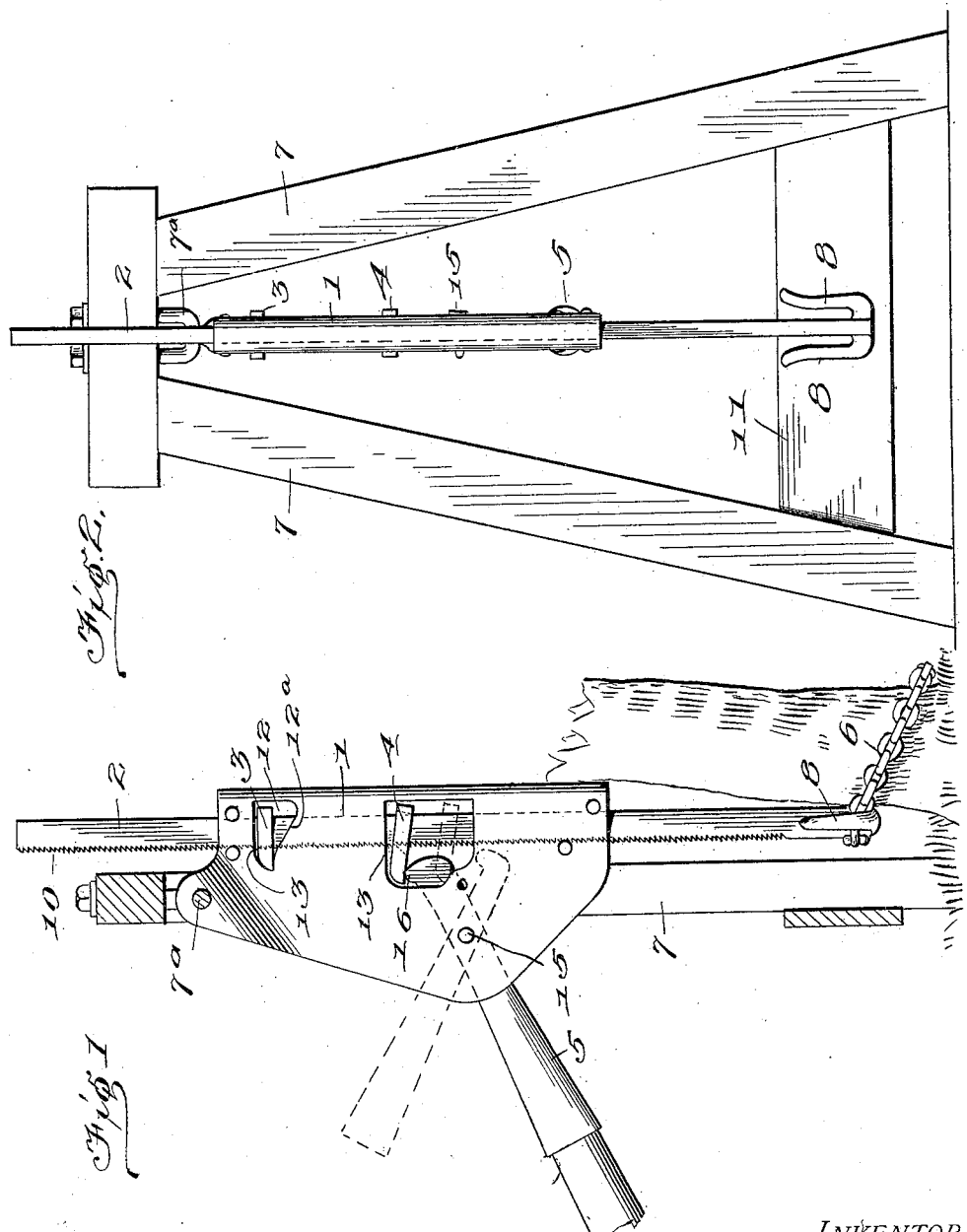
INVENTOR
Martin Kimble.
WITNESSES
BY
Milo B. Stevens & Co.
Attorneys

UNITED STATES PATENT OFFICE.

MARTIN KIMBLE, OF HIGHWOOD, ILLINOIS.

HOISTING DEVICE.

No. 917,311.　　　　Specification of Letters Patent.　　　Patented April 6, 1909.

Application filed April 22, 1908. Serial No. 428,541.

*To all whom it may concern:*

Be it known that I, MARTIN KIMBLE, a citizen of the United States, residing at Highwood, in the county of Lake and State of Illinois, have invented certain new and useful Improvements in Hoisting Devices, of which the following is a specification.

This invention is a hoisting device particularly adapted for pulling posts, stumps and the like, but useful as a jack for lifting purposes generally.

The object of the invention is to provide an improved device of the kind characterized particularly by automatically acting catches which engage the hoisting bar as the same is being operated.

The invention is illustrated in the accompanying drawings, in which—

Figure 1 is a side elevation. Fig. 2 is a similar view at right angles to Fig. 1.

Referring specifically to the drawings, 1 indicates a hollow head through which the lifting bar 2 is slidable. This bar is serrated along one edge, as indicated at 10. At the lower end it has a hook 8 to hold the chain 6 or other device used to grip the post or other article to be lifted. The head is hung at the top by means of an eye bolt $7^a$ depending from a cross piece at the top of legs 7 which may be strengthened by a cross brace 11 at the bottom. The head is conveniently formed by folding a piece of heavy sheet metal forming opposite cheeks, and these cheeks are provided with openings 12 in which the dogs 3 and 4 work. The dogs consist of loops which extend around the lifting bar, and each of them has an edge 13 which will engage in the serrations of the bar when the loops are inclined at an angle to the axis of the bar. The side edges of the loops project into the openings 12 in the cheeks, and the lower edge of the upper opening is inclined as at $12^a$. The upper dog 3 acts as a catch to prevent back slip, and the lower dog 4 receives the pressure of the lifting lever 5 which is fulcrumed at 15 between the cheeks of the head and the toe 16 of which engages under the dog 4 as shown.

In operation, when the lever is swung down it tilts the dog 4, causing its edge 13 to engage in one of the serrations of the bar, and on continued pressure the bar is lifted, sliding freely through the dog 3. When the lever is raised or eased off, the upper dog 3 drops against the inclined edges $12^a$ of the openings in each cheek, and is thereby tilted so that its edge 13 engages in the serrations in the bar and holds the bar against back slip. Meanwhile the dog 4 drops down for a fresh hold, and so the bar is lifted by successive operations of the lever and the load is hoisted. The device will be found particularly useful as a portable implement for pulling posts, small stumps and the like.

I claim:

In a hoisting device, the combination of a hollow head having cheeks with recesses therein, the recesses having lower edges inclined, a lifting bar slidable through the head between said recesses, a dog comprising a loop extending around said bar and having limited movement in said recesses and adapted to drop against said edges to tilt the loop and grip the bar therein, a lever, and means actuated thereby to lift the bar.

In testimony whereof I affix my signature, in presence of two witnesses.

MARTIN KIMBLE.

Witnesses:
　D. BRACKEN,
　JOHN F. KELLEY.